Nov. 10, 1942.    G. VAN DAAM    2,301,483
AIRPLANE FUEL TANK SAFETY DEVICE
Filed Nov. 3, 1939    2 Sheets-Sheet 1

INVENTOR.
GERRIT VAN DAAM
BY
Florian G. Miller
ATTORNEY.

Nov. 10, 1942.　　　G. VAN DAAM　　　2,301,483
AIRPLANE FUEL TANK SAFETY DEVICE
Filed Nov. 3, 1939　　　2 Sheets-Sheet 2

INVENTOR.
GERRIT VAN DAAM
BY Florian G. Miller
ATTORNEY.

Patented Nov. 10, 1942

2,301,483

UNITED STATES PATENT OFFICE 2,301,483

AIRPLANE FUEL TANK SAFETY DEVICE

Gerrit Van Daam, Buffalo, N. Y.

Application November 3, 1939, Serial No. 302,707

3 Claims. (Cl. 220—83)

This invention relates generally to safety devices for fuel tanks of airplanes and more particularly means for preventing the leakage and explosion of said tanks under all conditions.

According to the teachings of the prior art with which I am familiar, no tanks for fuel have been provided to prevent leakage therefrom upon an object such as a bullet passing through the walls of the tank. All of the tanks now installed in airplanes tend to explode when there is a bad wreck, because of the impact causing high pressure and heat in the tank.

It is accordingly an object of my invention to remedy the above and other defects in fuel tanks used in airplane construction and it is more particularly an object of my invention to provide means for ejecting an extinguishing fluid over the surface of the fuel in the fuel tank to prevent burning or explosion thereof upon the happening of certain events.

Another object of my invention is to provide a tank which will withstand puncture by a comparatively large object, such as a bullet, without leakage of the tank.

Another object of my invention is to provide means on the external surface of an airplane which will release an extinguishing fluid in a fuel tank, upon wreckage of the airplane.

Another object of my invention is to provide means for cutting off the fuel to the carbureter of the motor of the plane as well as ejecting extinguishing fluid over the surface of the fuel in the fuel tank of an airplane.

Another object of my invention is to provide manual means whereby the operator of the plane may cut off the fuel to the carbureter and release an extinguishing fluid in the fuel tank of the airplane.

Another object of my invention is to provide means to reduce the fire hazard in an airplane to an absolute minimum.

Other objects of my invention will become evident in the following detailed description taken in conjunction with the accompanying drawings in which, Fig. 1 is a perspective view of an airplane showing my release triggers disposed on the bottom of the wings of an airplane.

Figure 6:
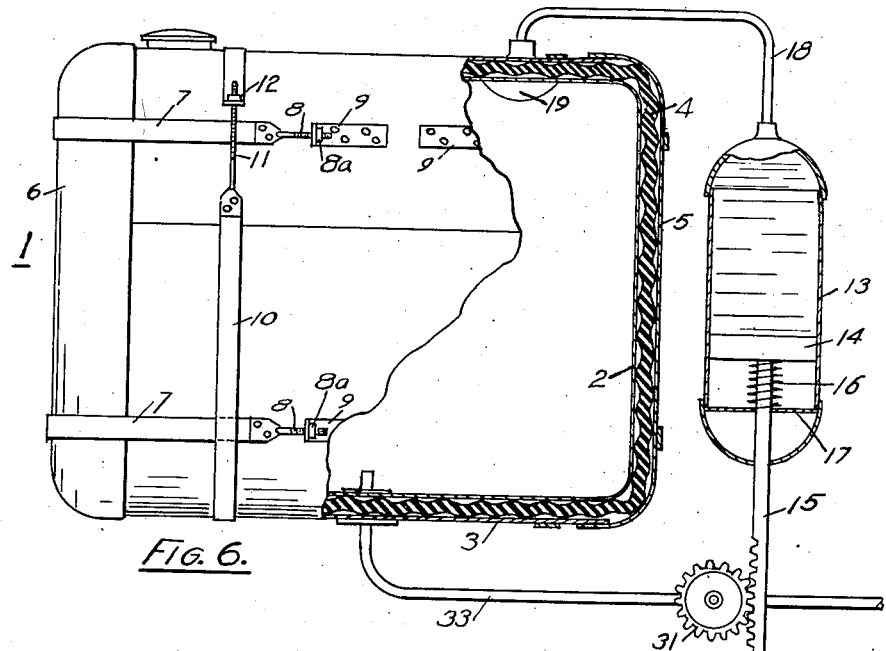
Fig. 6 is an enlarged diagrammatic view with parts broken away of my novel fuel tank for an airplane with attachments for cutting off the fuel passing therefrom and also for providing extinguishing fluid through the top of the tank.
Figure 7:
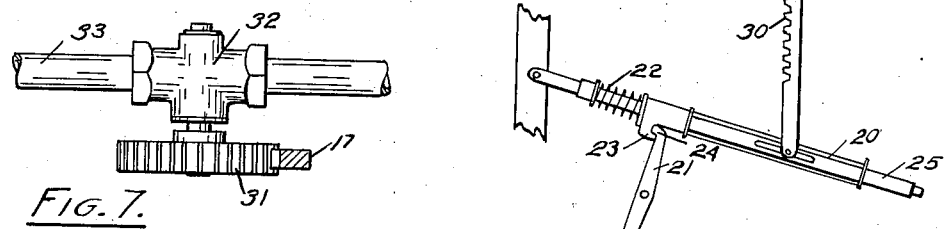
Fig. 7 is a top plan fragmentary view of the gear valve in the fuel line leading to the carbureter.

Referring to the drawings, Fig. 6 discloses a fuel tank 1 for use in airplanes having an inner lining 2 and an outer lining 3. Disposed between the inner and outer linings 2 and 3 is a compressed rubber 4 or any other similar elastic substance. The rubber is preferably vulcanized together and it is preferably rubber with bulges, bubbles or corrugations. Pressure is applied to the rubber or other similar elastic substance by means of telescopically disposed end covers 5 and 6, the pressure being applied through straps 7 with threaded portions 8 which pass through an aperture in flanges 9 disposed on the outer lining 3 of the tank 1. The threaded nuts 8—a engage the threaded portion 8 of the straps to draw the end covers inwardly towards the center of the tank 1 and apply pressure to the rubber 4. It will be evident that any means may be used which will apply pressure to the compressed rubber 4, and only one means is here shown to apply pressure. In the means shown in Fig. 6 for applying pressure to the rubber 4 in the tank 1, the pressure is first applied by encircling the inner lining 2 with an outer lining 3 of a strong light alloy. The straps 10 encircle the outer lining 3, which when screwed together through means of the threaded portion 11 and nut 12 cause the necessary pressure to be applied. This pressure, however, causes the material to overflow at the two ends of the tank so the two end covers 5 and 6 are disposed on the ends of the fuel tank and pulled together by means of the straps 7. This pressure on the rubber causes the rubber 4 to be compressed sufficiently to fulfill the function of closing any existing hole in the gas tank.

Figure 1:
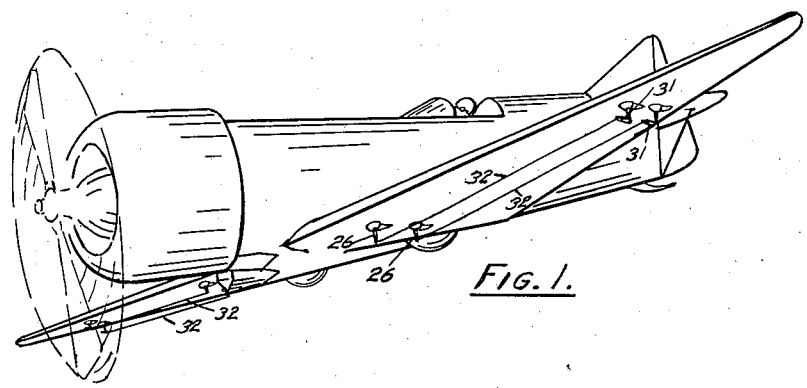
Figure 2:
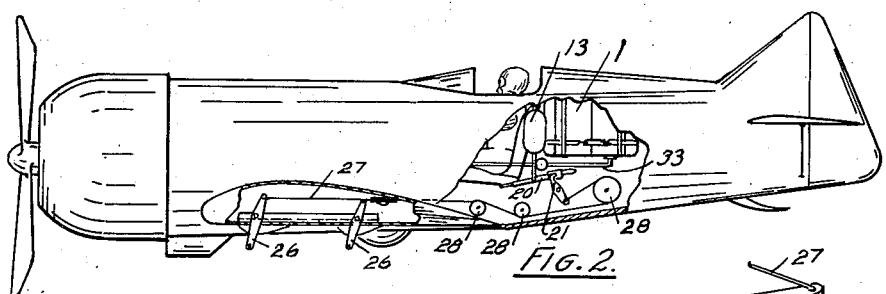
Fig. 2 is a side elevational view of an airplane with parts broken away to show the disposition of my invention in an airplane.
Figures 3, 5:
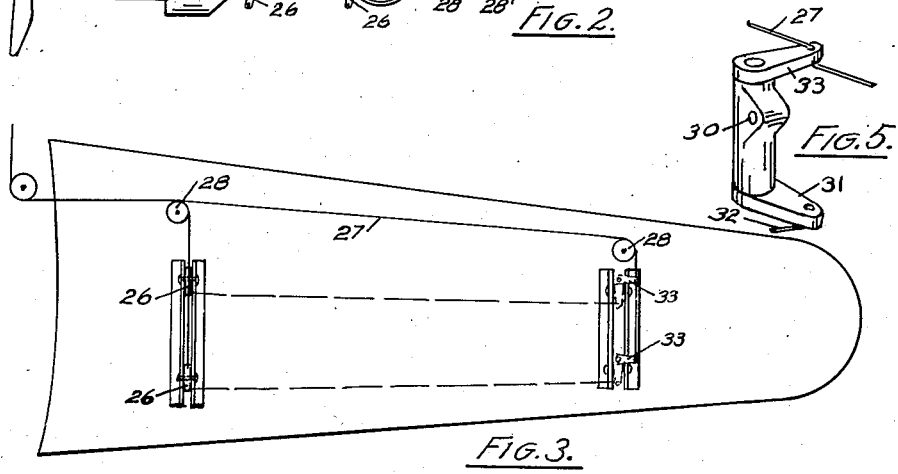
Fig. 3 is a top plan view of a wing of an airplane with the top part removed to show the releasing wires assembled therein.
Fig. 5 is an enlarged perspective view of means disposed in the wings of an airplane for connecting the release wires.

To prevent the explosion of the fuel tank 1 when subjected to great impact as when the airplane is wrecked, I have provided a container 13, wherein any form of extinguishing fluid may be contained. A piston 14 on rod 15 is urged upwardly in the container by a coil spring 16 disposed around the rod 15 between the under side of the piston 14 and the bottom portion 17 of the container 13. The container 13 is connected to the top of the fuel tank 1 by a pipe line 18. A nozzle 19 of any suitable type may be disposed in the tank 1 to disperse the extinguishing fluid over the whole surface of the fuel in the tank 1. The rod 15 is movably but fixedly attached to the pivoted arm 20, which is held by latching member 21 in a position to hold the coil spring 16 in a compressed condition and therefore the piston 14 in the bottom of the container 13. A spring 22 on the arm 20 urges the latching portion 23 into engagement with the latching portion 24 on the latching member 21. A handle 25 on the arm 20 provides for the upward movement of the piston 16 manually. Any suitable means may be provided to move the latching portion 23 away from the latching portion 24 on latching member 21 manually. The latching portion 24 of the latching member 21 is released automatically from the latching portion 23 on the arm 20 when the releasing triggers 26 strike an obstruction, wherein the releasing wires 27 attached to the latching member 21, through pulleys 28 cause the release of the latching member 21 and permit the piston 14 to move upwardly through the force of the coil spring 16. One of the releasing triggers shown in Fig. 5 is disposed in the wing of the plane so that movement of the releasing trigger in a forward or sideward direction will cause a pull on the releasing wire 27 and the operation of the extinguishing mechanism. The trigger shown in Fig. 5 is pivoted at 30 in order that it may rock in a direction longitudinally of the plane. Therefore, when it is rocked by direct contact, there is a pull on the releasing wire 27. The laterally extending bottom portion 31 has a wire 32 connecting the release triggers attached thereto. An outwardly extending member 33 is disposed on the upper portion of the release trigger 26 at substantially right angles to the laterally extending member 31 so that a pull on the wire 27 will cause a bell-crank action to provide a pulling force on the releasing wire 27.

A rack 35 is cut on the side of the rod 17 which engages a valve gear 36, which in turn operates a valve 37 disposed in the fuel line 38 leading from the fuel tank 1 to the carbureter of the motor (not shown). Upon upward movement of the rod 15, the rack 34 moves the valve gear 35 to bring the valve 36 in the fuel line 37 to a closed position. When the piston 14 is again forced to the bottom of the container 13 the rod 15 moves downwardly and the rack portion 34 thereon engages the valve gear 35 to move the valve 36 in the fuel line 37 to an open position, thereby opening the feed line 36 leading to the carbureter of the motor (not shown).

In operation it will be apparent that no bullet or any other object of reasonable size will cause a leakage of the tank 1 because of the compressed rubber 4 or other elastic substance which is disposed in the walls of the tank 1. Upon the plane being wrecked the release triggers 26 will be operated, thereby causing a pull on the release wire 27 to release the latching portion 24 and the latching member 21 from the latching portion 23 on the arm 20. The arm 30 is then freed and the spring 18 forces the piston 14 upwardly in the container 13, thereby forcing the extinguishing fluid through the line 18 leading into the top of the fuel tank 1. The nozzle 19 or any other suitable member is disposed inside the tank 1 to spread the extinguishing fluid over the entire surface of the fuel in the tank 1. Upon this upward movement of the rod 15 the rack 34 formed thereon engages a valve gear 35 to move the valve 36 to a closed position in the fuel line 37 leading to the carbureter of the motor.

Figure 4:
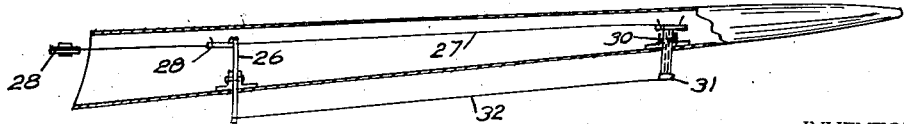
Fig. 4 is a side elevation of an airplane wing with parts broken away showing my novel trigger and releasing wires.

It will be evident that any form of release triggers or the like may be used. One form is shown more particularly in Figs. 3, 4 and 5, although any other form of mechanism might be used.

Figure 8:
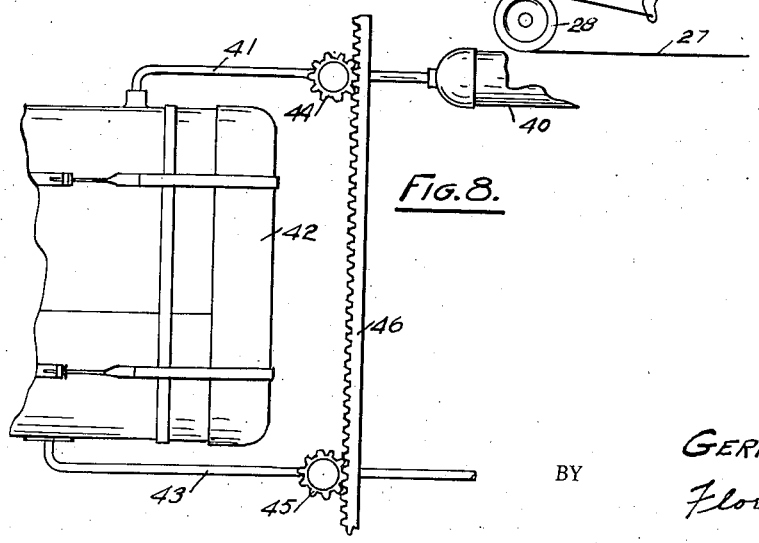
Fig. 8 is a diagrammatic view showing a modified form of construction for releasing extinguishing fluid in the fuel tank and for cutting off the fuel to the carbureter.

Fig. 8 is a diagrammatic view of a modified form of mechanism for applying extinguishing fluid to the surface of the fuel in the tank, and for cutting off the fuel line leading to the carbureter of the motor of the airplane. In this modification a tank 40 is provided with extinguishing fluid under pressure with a feed line 41 leading to the tank 42. The feed line 43 leads to the carbureter of the motor of the airplane (not shown). Gear valves 44 and 45 are disposed in the fuel lines 41 and 43 respectively. A rack 46 common to both gear valves 44 and 45 engage the gear valves 44 and 45 to move them to open and closed positions. The rack 46 is connected to mechanism such as the arm 20 shown in Fig. 6. It will be apparent that many forms of latching mechanisms and the like may be used to operate the rack gear 46 manually and through releasing wires and the like.

It will be apparent that I have provided a fool-proof fuel tank for an airplane which is bullet proof and which brings the danger of fire to an airplane to an absolute minimum through the manipulation of one control. By releasing the master control which is the arm 20 as shown in Fig. 6, the pilot can close the fuel line 37, leading to the carbureter of the motor and at the same time open the valve of a pressure tank as shown in my modified form of construction, which will extinguish or prevent any fire, or the extinguishing system shown in Fig. 6 might be utilized with the master control. A pressure spray inside the tank sprays the fluid in every direction.

Various changes may be made in the specific embodiment of the present invention without departing from the spirit thereof or from the scope of the appended claims.

What I claim is:

1. A fuel tank for an airplane comprising a closed vessel having an inner wall, rubber surrounding said inner wall, an outer wall covering the sides of said vessel, telescopically disposed outer end members covering the ends of said vessel, and means for drawing the outer ends of said vessel inwardly to compress the rubber between said inner and outer walls.

2. A fuel tank for an airplane comprising a closed vessel having inner and outer walls, corrugated rubber material between said inner and outer walls, and means for compressing said material.

3. A fuel tank for an airplane, comprising a closed vessel having inner and outer walls, wavy rubber sheet material disposed between said inner and outer walls, and means for compressing said material.

GERRIT VAN DAAM.